(12) United States Patent
Lin

(10) Patent No.: US 8,113,690 B2
(45) Date of Patent: Feb. 14, 2012

(54) FLASH LAMP MODULE AND PORTABLE ELECTRONIC DEVICE USING SAME

(75) Inventor: Tsung-Yu Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 295 days.

(21) Appl. No.: 12/507,149

(22) Filed: Jul. 22, 2009

(65) Prior Publication Data

US 2010/0027268 A1 Feb. 4, 2010

(30) Foreign Application Priority Data

Aug. 1, 2008 (CN) .......................... 2008 1 0303314

(51) Int. Cl.
*F21V 19/02* (2006.01)
(52) U.S. Cl. ............... 362/285; 362/3; 362/7; 362/269; 362/270; 362/271; 362/272; 362/286; 362/287; 396/175
(58) Field of Classification Search .................. 362/3, 7, 362/8, 11, 16, 269–272, 279, 284–287, 398; 396/62, 175; 378/15
See application file for complete search history.

(56) References Cited

U.S. PATENT DOCUMENTS

| | | | | |
|---|---|---|---|---|
| 4,870,548 A * | 9/1989 | Beachy et al. | ................. | 362/145 |
| 4,945,459 A * | 7/1990 | Ferren et al. | .................. | 362/284 |
| 5,019,845 A * | 5/1991 | Asakura et al. | ............... | 396/175 |
| 5,023,648 A * | 6/1991 | Meguro et al. | ................ | 396/190 |
| 5,142,455 A * | 8/1992 | Kosmatka | ..................... | 362/514 |
| 5,652,920 A * | 7/1997 | Kaihara et al. | .................. | 396/62 |
| 6,354,721 B1* | 3/2002 | Zattoni | ......................... | 362/513 |
| 7,406,256 B1* | 7/2008 | Adolphi et al. | .................... | 396/4 |
| 7,819,538 B2* | 10/2010 | Nobayashi et al. | ............. | 362/35 |
| 2002/0196627 A1* | 12/2002 | Shin | ................................ | 362/286 |
| 2003/0007353 A1* | 1/2003 | Patrick, III | ..................... | 362/277 |
| 2008/0029701 A1* | 2/2008 | Onozawa et al. | ............. | 250/332 |
| 2008/0074055 A1* | 3/2008 | Peterson et al. | ........... | 315/241 P |
| 2008/0260372 A1* | 10/2008 | Shin | .............................. | 396/176 |
| 2009/0290351 A1* | 11/2009 | Chan | ................................ | 362/277 |

FOREIGN PATENT DOCUMENTS

| | | |
|---|---|---|
| CN | 2312468 Y | 3/1999 |
| CN | 2653813 Y | 11/2004 |

* cited by examiner

*Primary Examiner* — Jong-Suk (James) Lee
*Assistant Examiner* — Stanley Weinberg
(74) *Attorney, Agent, or Firm* — Altis Law Group, Inc.

(57) ABSTRACT

An exemplary flash lamp module includes a light source, a holding pole, a lampshade, a slide orbit and a driving portion. The light source is mounted on the holding pole. The lampshade is configured for covering the light source. The lampshade has an opening configured for allowing light beams emitted from the light source passing through the opening. The slide orbit is configured for supporting and allowing the lampshade moving therealong. The driving portion is configured for driving the lampshade to move along the slide orbit so as to change the direction of emitting of light beams through the opening.

17 Claims, 5 Drawing Sheets

FLASH LAMP MODULE AND PORTABLE ELECTRONIC DEVICE USING SAME

BACKGROUND

1. Technical Field

The present disclosure relates to a flash lamp module, and particularly to a flash lamp module applied in a portable electronic device and a portable electronic device having the flash lamp module.

2. Description of Related Art

Portable electronic devices such as mobile phones and personal digital assistants (PDAs) are now in widespread use. Portable electronic devices with multi-function such as image capture function are popular with consumers.

In a typical portable electronic device with a camera module, a flash lamp is usually arranged near a lens of the camera module, and light beams emitted from the flash lamp can only illuminate forward. That is, the flash lamp can only provide light in one direction.

Therefore, a new flash lamp module and a portable electronic device having the flash lamp module are desired to overcome the shortcomings described above.

BRIEF DESCRIPTION OF THE DRAWINGS

Many aspects of the present flash lamp module and portable electronic device can be better understood with reference to the following drawings. The components in the drawings are not necessarily to scale, the emphasis instead being placed upon clearly illustrating the principles of the present flash lamp module and portable electronic device. Moreover, in the drawings, like reference numerals designate corresponding parts throughout the several views.

DETAILED DESCRIPTION

Reference will now be made to the drawings to describe in detail of the exemplary embodiments of the flash lamp module and the portable electronic device.

Figure 1:
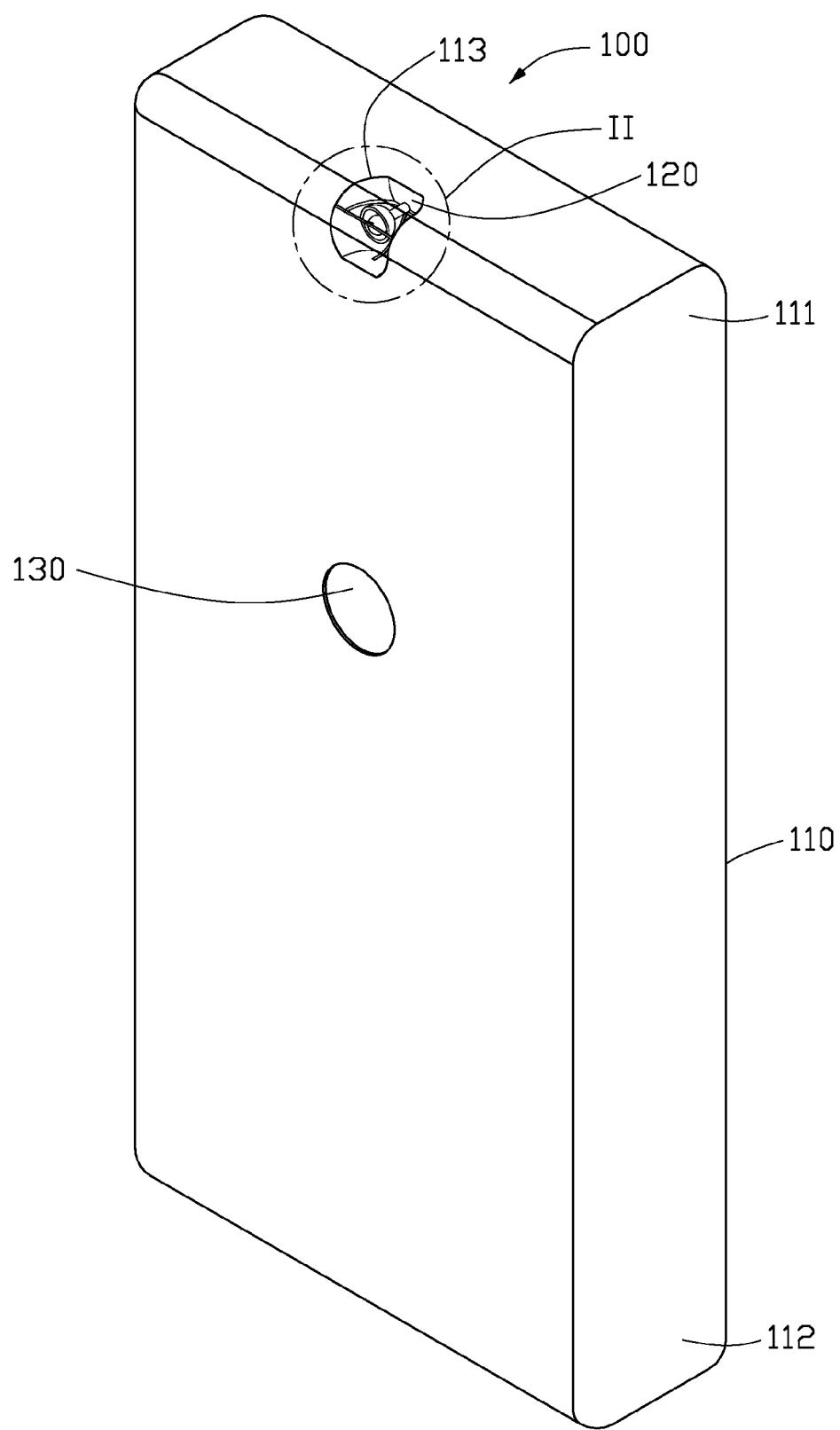
FIG. 1 is a schematic, isometric view of a portable electronic device in accordance with an exemplary embodiment, the portable electronic device having a camera module and a flash lamp module mounted therein.

Referring to FIG. 1, a portable electronic device 100, in accordance with an exemplary embodiment, includes a main body 110, a flash lamp module 120 arranged at an end of the main body 110, and a camera module 130 embedded in the main body 110.

The main body 110 has a first and second ends 111, 112. A receiving cavity 113 is formed in the first end 111. The flash lamp module 120 is arranged in the receiving cavity 113. The camera module 130 is arranged in the main body 110, and faces a back surface of the main body 110.

Figure 2:
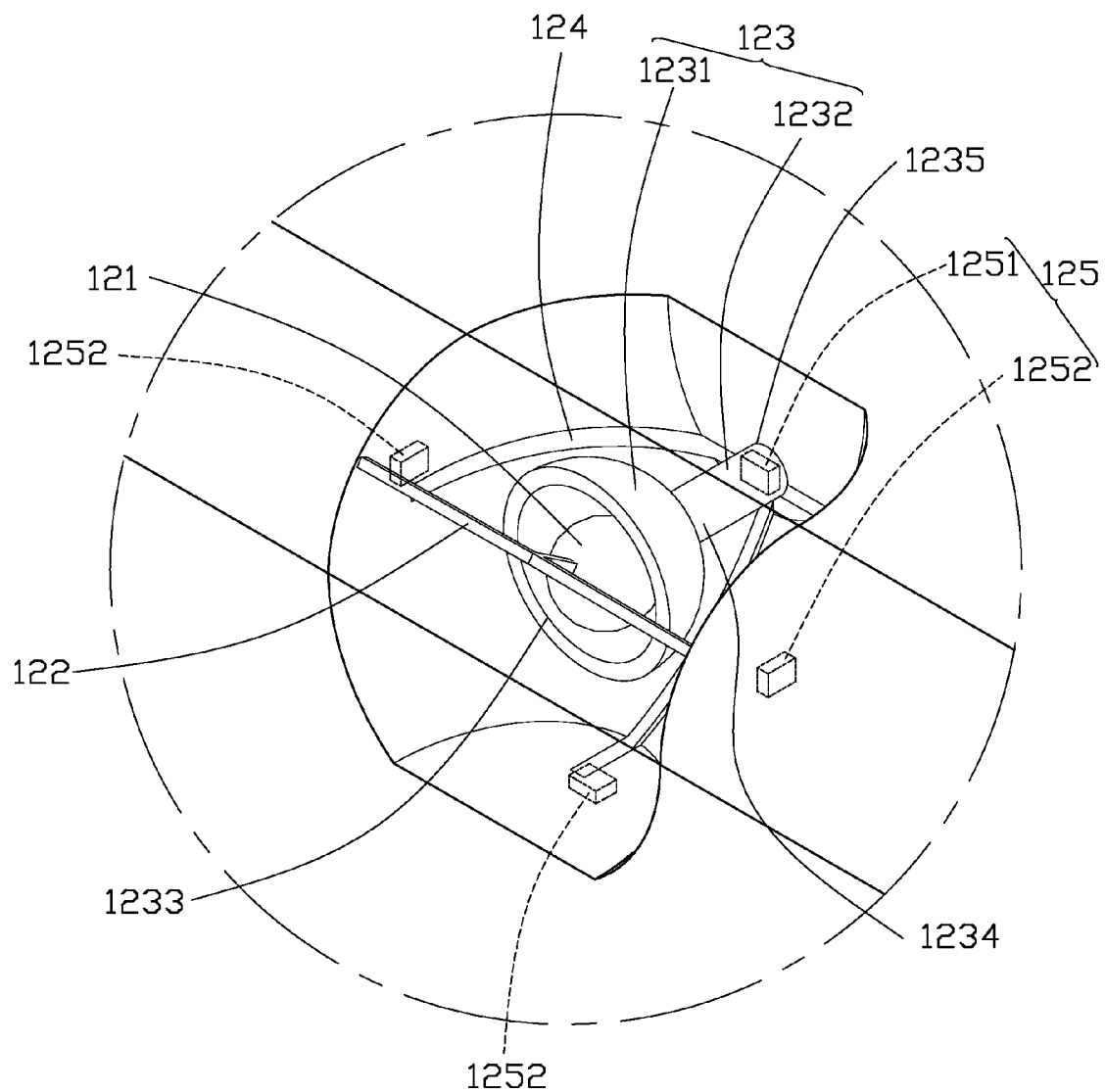
FIG. 2 is a schematic, partly-enlarged view of the flash lamp module shown in FIG. 1.

Referring to FIG. 2, the flash lamp module 120 includes a light source 121, a holding pole 122, a lampshade 123, a slide orbit 124 and a driving portion 125.

The light source 121 is mounted on the holding pole 122. The light source 121 can be light emitting diodes, laser diodes, etc. In the present embodiment, the light source 121 is a light emitting diode.

The holding pole 122 is fixed to inner wall of the receiving cavity 113. The holding pole 122 can be a tube, and electrical wires of the light source 121 can be received in the tube.

The lampshade 123 includes a shade 1231 and a supporting pole 1232. The shade 1231 is a hollow hemispheroid. The shade 1231 has an opening 1233. The light source 121 is received in the shade 1231. A reflecting coating can be formed on the inner wall of the shade 1231, such that light beams emitted from the light source 121 can be reflected and redirected by the inner wall to exit through the opening 1233 of the shade 1231. Alternatively, the inner wall of the shade 1231 can be a mirror to reflect the light beams and allow them emitting through the opening 1233.

The shade 1231 is fixed on the supporting pole 1232 and is supported by the supporting pole 1232. The supporting pole 1232 has a first and second ends 1234, 1235. The shade 1231 is connected to the first end 1234. The second end 1235 is movably arranged on the slide orbit 124 and can be driven by the driving portion 125.

The slide orbit 124 is substantially T-shaped. The supporting pole 1232 can slide along the slide orbit 124 in three directions: the left, the right and the downward directions.

Figure 3:
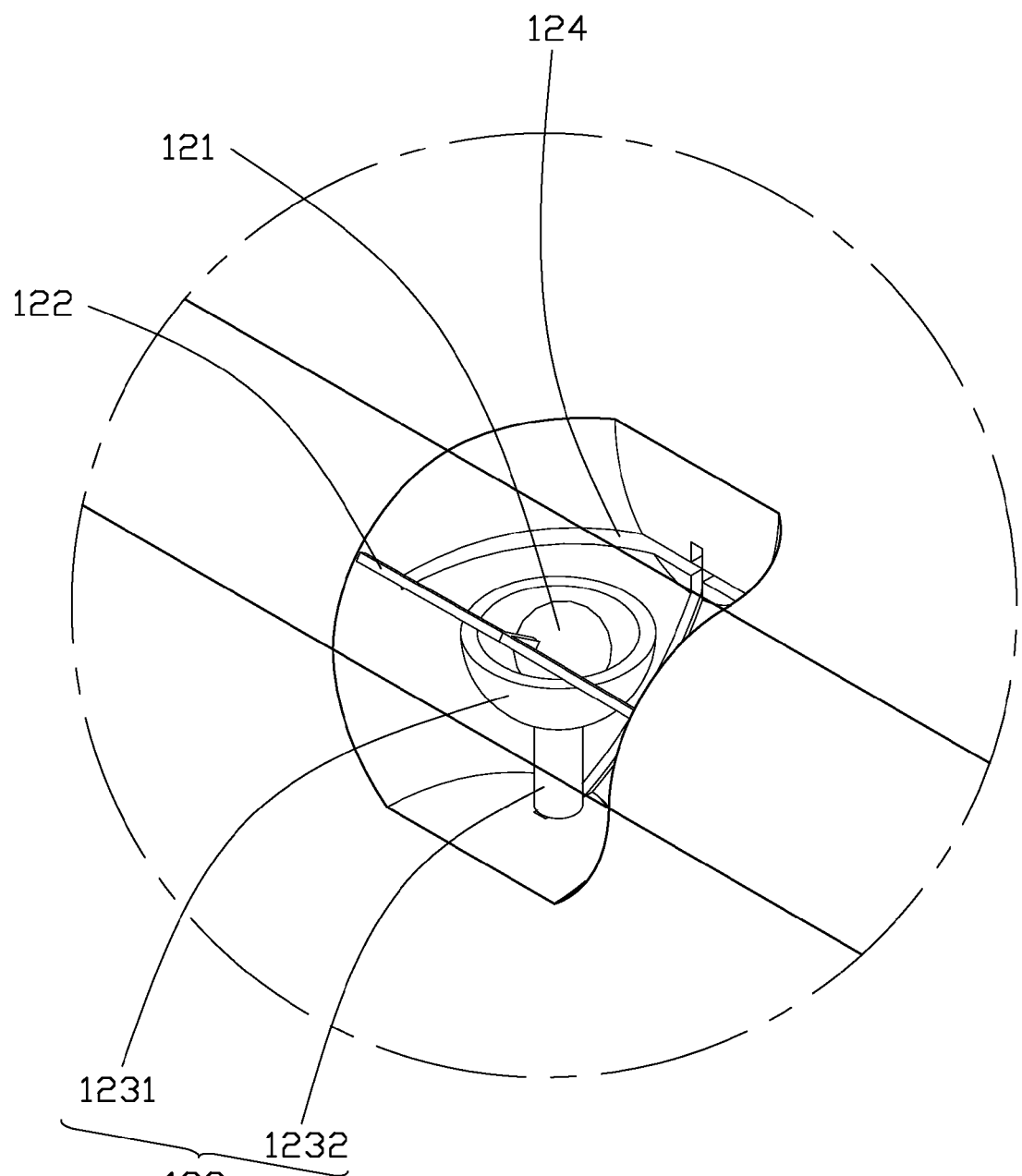
FIG. 3 shows the flash lamp module shown in FIG. 2 when the flash lamp module provides upward light beams.

The driving portion 125 is configured for driving the supporting pole 1232 to move along the slide orbit 124, to change the position of the holding pole 122, such that the illumination direction of the light beams emitted from the light source 121 can be changed. In the present embodiment, the driving portion 125 is made from electromagnetism technology. The end 1235 of the supporting pole 1232 defines a recess therein. The driving portion 125 includes a magnetic core 1251 arranged in the recess of the second end 1235 of the supporting pole 1232, and three electromagnets 1252 respectively arranged adjacent to three different positions of the slide orbit 124. The three electromagnets 1252 are respectively arranged in the receiving cavity 113, and are adjacent to three end positions of the slide orbit 124. Hereby, when the electromagnet 1252 adjacent to bottom end of the slide orbit 124 is electrified by a control circuit (not shown), the magnetic core 1251 is attracted by the electromagnet 1252 adjacent to the bottom end of the slide orbit 124, and the supporting pole 1232 moves towards the bottom end of the slide orbit 124 until it arrives the bottom end of the slide orbit 124, such that the supporting pole 1232 can be moved to the bottom end of the slide orbit 124 (see FIG. 3). At this time, the opening 1233 of the shade 1231 faces upwards, and light beams emitted from the light source 121 illuminate upwards. It is understood that the number of the electromagnets 1251 can be more than three. More electromagnets 1251 can be arranged at more places of the slide orbit 124 to make the supporting pole 1232 stop respectively at several different places.

It is understood that the driving portion 125 may be some other mechanisms or electric devices. For example, the driving portion 125 may be a driving motor and a gemel, and gemel is connected with the end 1235 of the supporting pole 1232. The driving motor drives the gemel to rotate, such that the supporting pole 1232 will be driven to move under the driving force of the driving motor.

The driving portion 125 may include a wheel and a controlling device for controlling the moving time and the moving direction of the wheel. The wheel can be arranged on the end 1235 of the supporting pole 1232. The controlling device can be arranged in the recess of the second end 1235 of the supporting pole 1232. By this means, the supporting pole 1232 can be driven and controlled by the driving portion 125.

Figure 4:
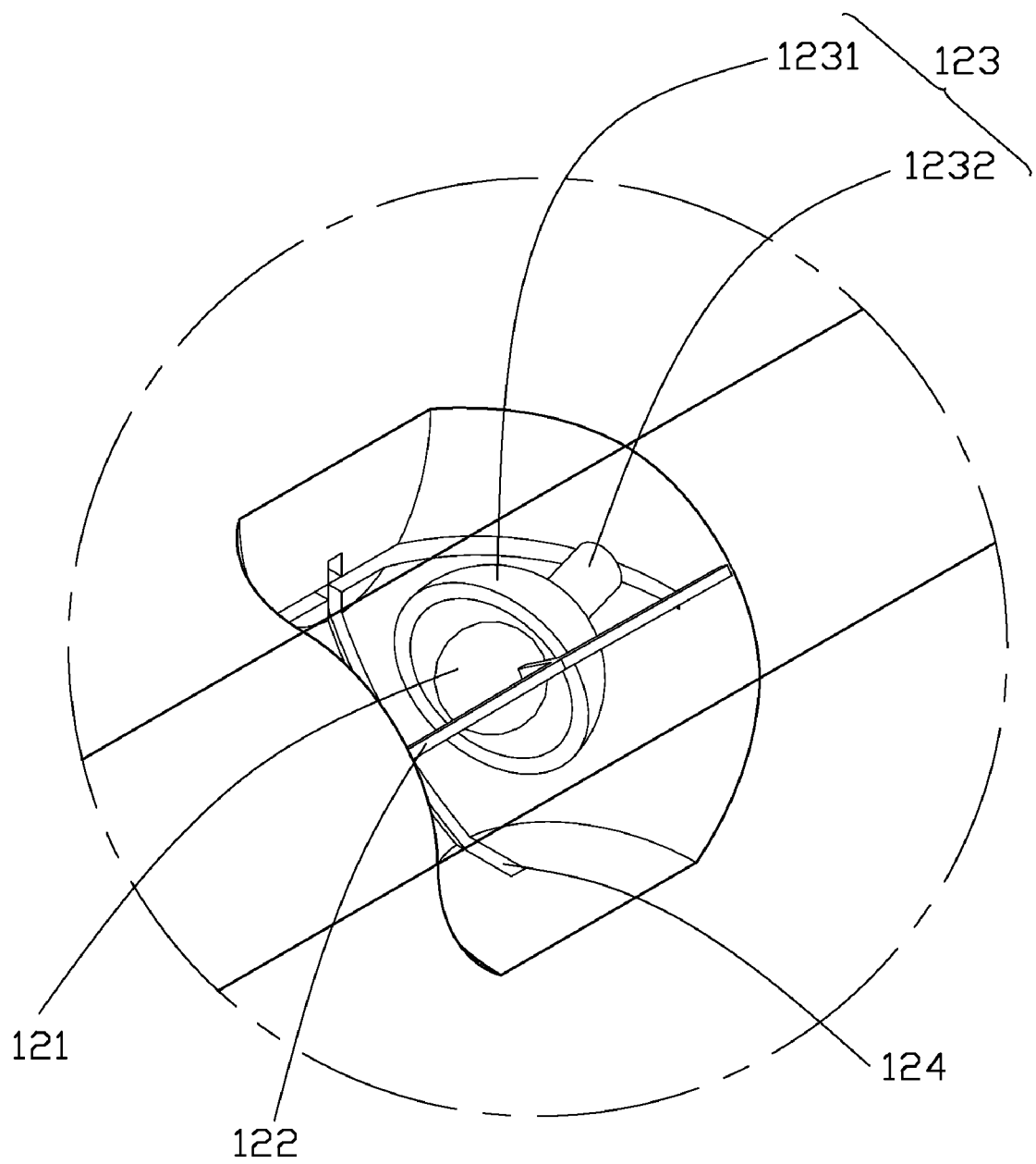
FIG. 4 shows the flash lamp module shown in FIG. 2 when the flash lamp module provides sideward light beams.

Referring to FIG. 4, the supporting pole 1232 moves to the left end of the T-shaped slide orbit 124. At this time, the opening 1233 of the shade 1231 faces towards a side direction of the portable electronic device 100, and it can be applied in some especial conditions.

Figure 5:
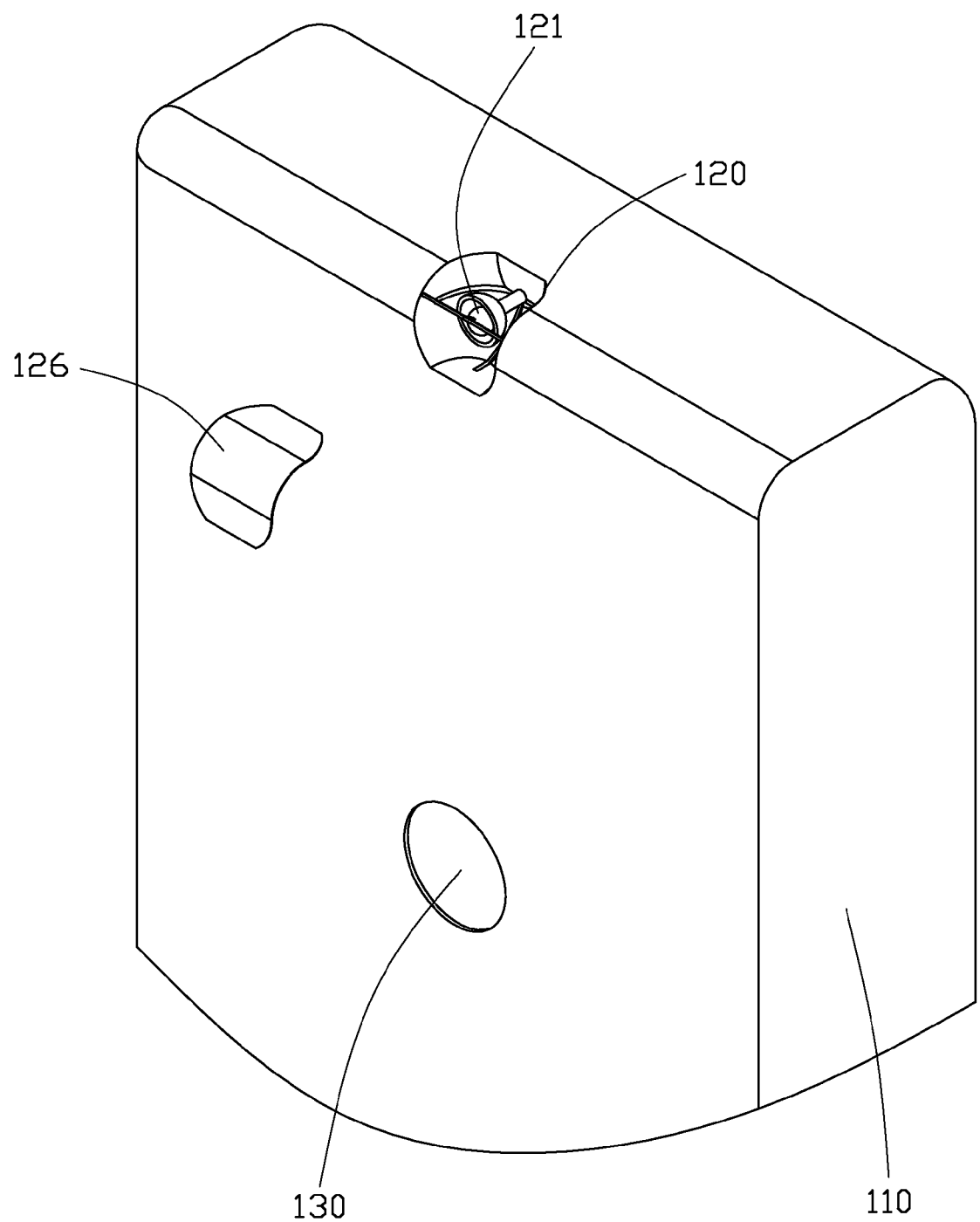
FIG. 5 is a schematic, partially-exploded view of the portable electronic device of FIG. 1.

Referring to FIG. 5, the flash lamp module 120 further includes a transparent cover 126 covering the light source 121 and configured for protecting the light source 121 and other components of the flash lamp module 120. The surface of the transparent cover 126 can include a micro-lens array to enhance emitting efficiency and uniformity of light beams emitted from the light source 121. Alternatively, the surface of the transparent cover 126 may have an anti-reflecting coating coated thereon.

While the present disclosure has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A flash lamp module, comprising:
    a light source;
    a holding pole, the light source being mounted on the holding pole;
    a lampshade comprising a shade and a supporting pole, the light source being received in the shade, the shade having an opening and a reflecting surface configured for reflecting and directing light beams emitted from the light source to pass through the opening, the supporting pole comprising a first end and an opposite second end, the shade being mounted on the first end of the supporting pole, the second end of the supporting pole defining a recess therein;
    a slide orbit, the second end of the supporting pole being movable on the slide orbit; and
    a driving portion configured for driving the supporting pole to move along the slide orbit so as to change illumination direction of the light beams, the driving portion comprising a magnetic core arranged in the recess and three electromagnets respectively arranged adjacent to three different positions on the slide orbit.

2. The flash lamp module of claim 1, wherein the slide orbit is T-shaped.

3. The flash lamp module of claim 2, wherein the three electromagnets are respectively arranged at three distal ends of the T-shaped slide orbit.

4. The flash lamp module of claim 1, wherein the light source comprises a light emitting diode.

5. The flash lamp module of claim 1, wherein the shade is a hemispheroid.

6. The flash lamp module of claim 1, wherein the shade comprises a reflecting coating coated on inner surface of the shade.

7. The flash lamp module of claim 1, further comprising a transparent cover covering the light source, the cover being configured for protecting the light source and other components of the flash lamp module.

8. A portable electronic device, comprising:
    a main body comprising two opposite ends;
    a flash lamp module arranged at one end of the main body comprising:
        a light source;
        a holding pole, the light source being mounted on the holding pole;
        a lampshade comprising a shade and a supporting pole, the light source being received in the shade, the shade having an opening and a reflecting surface configured for reflecting and directing light beams emitted from the light source to pass through the opening, the supporting pole comprising a first end and an opposite second end, the shade being mounted on the first end of the supporting pole, the second end of the supporting pole defining a recess therein;
        a slide orbit, the second end of the supporting pole being movable on the slide orbit; and
        a driving portion configured for driving the supporting pole to move along the slide orbit so as to change illumination direction of the light beams, the driving portion comprising a magnetic core arranged in the recess and three electromagnets respectively arranged adjacent to three different positions on the slide orbit; and
    a camera module arranged in the main body.

9. The portable electronic device of claim 8, wherein an end of the main body comprises a receiving cavity, and the flash lamp module is arranged in the receiving cavity.

10. The portable electronic device of claim 8, wherein the slide orbit is T-shaped.

11. The portable electronic device of claim 10, wherein the three electromagnets are respectively arranged at three distal ends of the T-shaped slide orbit.

12. The portable electronic device of claim 8, wherein the light source comprises a light emitting diode.

13. The portable electronic device of claim 8, the shade is a hemispheroid.

14. The portable electronic device of claim 8, wherein the shade comprises a reflecting coating coated on inner surface of the shade.

15. The portable electronic device of claim 8, further comprising a transparent cover covering the light source, the cover being configured for protecting the light source and other components of the flash lamp module.

16. A flash lamp module, comprising:
    a light source;
    a holding pole, the light source being mounted on the holding pole;
    a lampshade configured for covering the light source, the lampshade having an opening and a reflecting surface configured for reflecting and directing light beams emitted from the light source to pass through the opening, the lampshade comprising a recess defining on an end thereof;
    a slide orbit configured for supporting and allowing the lampshade to move therealong; and
    a driving portion configured for driving the lampshade to move along the slide orbit so as to change illumination direction of the light beams, the driving portion comprising a magnetic core arranged in the recess and three electromagnets respectively arranged adjacent to three different positions on the slide orbit.

17. The flash lamp module of claim 16, wherein the slide orbit is T-shaped.

* * * * *